United States Patent [19]

Kuester

[11] 4,016,948
[45] Apr. 12, 1977

[54] DUAL STEERING SYSTEM FOR VEHICLE
[75] Inventor: Donald A. Kuester, Wausau, Wis.
[73] Assignee: J. I. Case Company, Racine, Wis.
[22] Filed: Nov. 17, 1975
[21] Appl. No.: 632,515
[52] U.S. Cl. .............................. 180/132; 180/160
[51] Int. Cl.² ......................................... B62D 5/08
[58] Field of Search .......... 180/132, 135, 140, 154, 180/163; 212/38

[56] References Cited

UNITED STATES PATENTS 2,874,792   2/1959   Scheuepfug ...................... 180/140

FOREIGN PATENTS OR APPLICATIONS 1,263,364   2/1972   United Kingdom ............... 180/140

Primary Examiner—Joseph F. Peters, Jr.
Assistant Examiner—John A. Pekar
Attorney, Agent, or Firm—Dressler, Goldsmith, Clement, Gordon & Shore, Ltd.

[57]  ABSTRACT

A vehicle having a vehicle chassis supported on wheels and a cab rotated about a vertical axis on the chassis is disclosed herein. A dual steering system is incorporated in the vehicle so that the vehicle can be operated through a hydrostatic steering system while being manipulated at a work site and can readily be converted to a mechanical steering system for highway travel.

3 Claims, 3 Drawing Figures

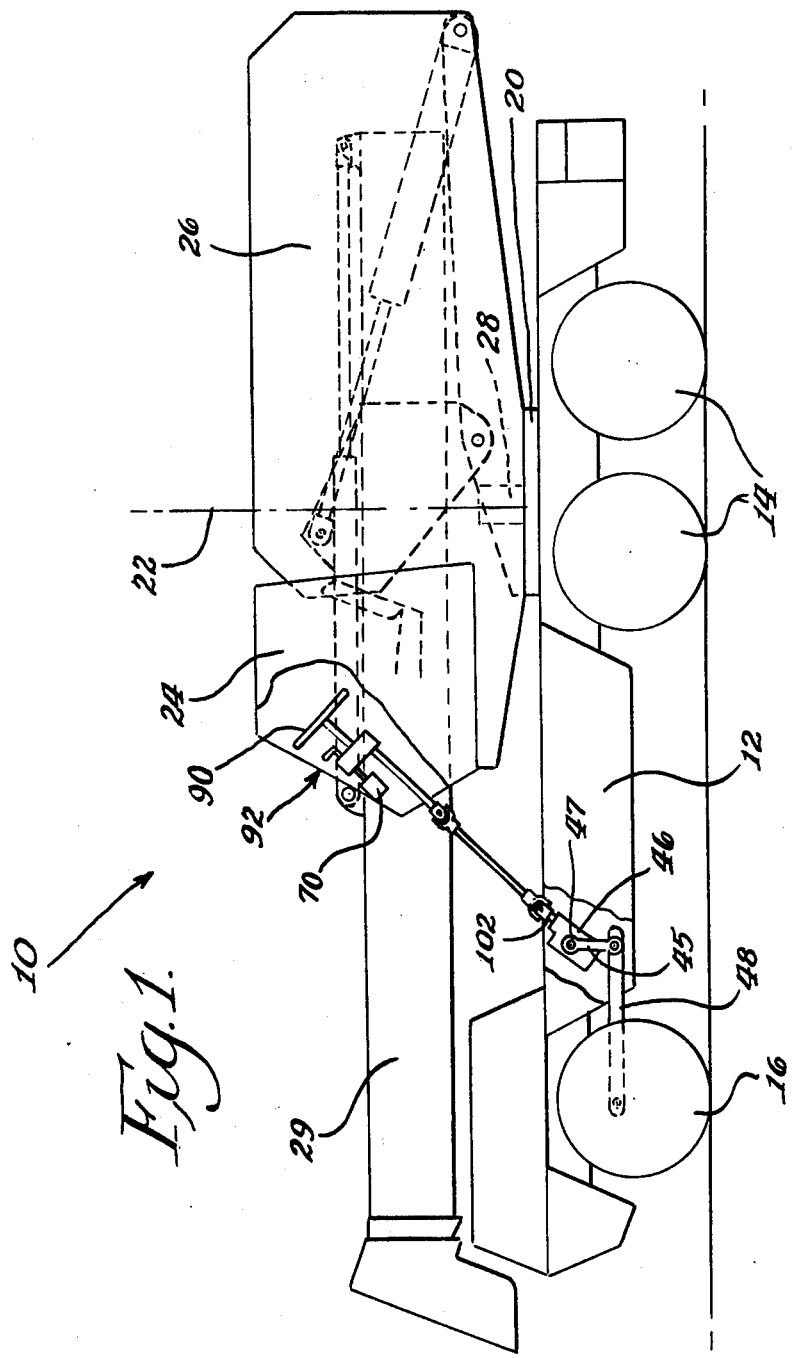

U.S. Patent April 12, 1977 4,016,948
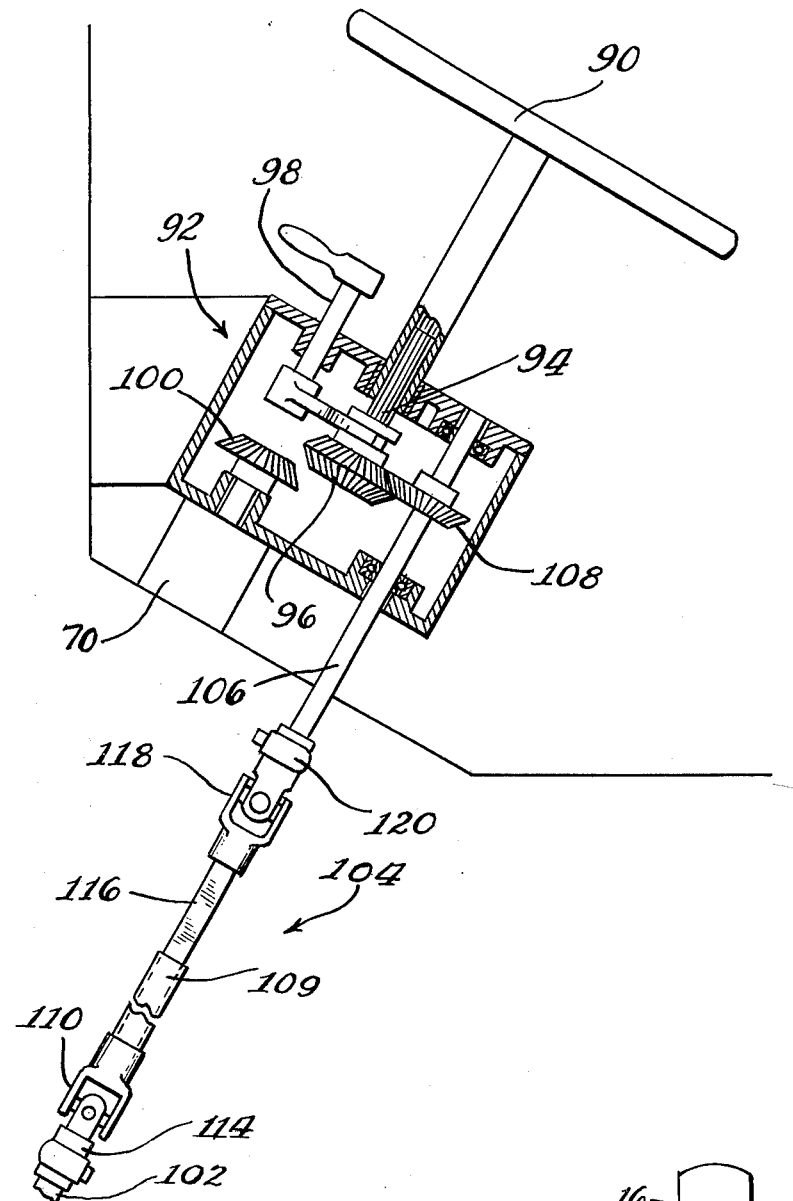
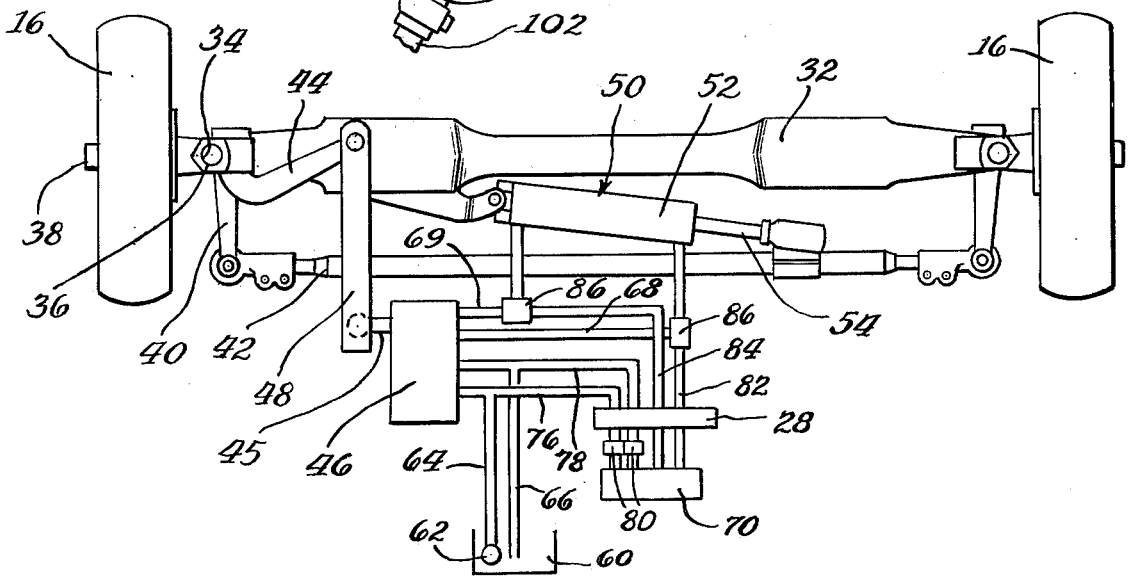

DUAL STEERING SYSTEM FOR VEHICLE

BACKGROUND OF THE INVENTION

Heavy duty material handling vehicles have been in existence for a number of years. One type of such unit is a truck mounted crane wherein a turntable is supported for rotation about a vertical axis on a vehicle chassis frame and the turntable supports a material handling unit, such as a telescopic crane.

Because of the relative rotation between the vehicle chassis and the turntable, it has become customary in such vehicles to utilize hydrostatic steering for the vehicle. Hydrostatic steering consists of a hydrostatic steering valve that is located in the operator's compartment of the vehicle and is connected to a fluid ram which is located between the vehicle chassis and the steered front wheels for the vehicle.

Hydrostatic steering simplifies the interconnection between the steering wheel and the steered wheels at the front end of the vehicle because the connection can be made through conduits and a hydraulic swivel which is normally interposed between the turntable and the vehicle chassis. This permits 360 degree rotation of the turntable or upper crane unit with respect to the chassis frame.

Since hydrostatic steering is accomplished through the transfer of fluid from a pressurized fluid source through the hydrostatic steering valve to the fluid ram, loss of hydraulic power immediately reduces the control of the vehicle to a small fraction of that in existence when hydraulic power is available because all of the fluid transfer must be made by the forces applied by the operator to the steering wheel. Thus, when hydraulic power is lost during highway travel or near other traffic, an immediate dangerous condition is developed which can result in serious accidents. Thus, construction equipment manufacturers which utilize hydrostatic steering normally limit vehicle speeds to a maximum of 25 to 30 miles per hour.

Such limitation on the speed of the vehicle for transportation along major highways or other well travelled roads results in a substantial loss of operating time which is important to any construction equipment user, particularly in heavy duty equipment of this type.

SUMMARY OF THE INVENTION

According to the present invention, a vehicle consisting of a vehicle chassis supported on wheels, two of which are steered to control the direction of the vehicle, is designed to have a hydrostatic steering system for use at a work site while still allowing for vehicle travel at maximum existing speed limits on highways.

The vehicle to which the present invention is particularly adapted consists of a chassis frame that is supported on a plurality of wheels, with at least a pair of front steerable wheels and a cab rotated about a vertical axis on the vehicle chassis. The dual steering system consists of a hydrostatic steering system including a hydrostatic steering valve located in the operator's cab for the vehicle and controlled by a steering wheel. The hydrostatic steering valve is connected to a fluid ram located between the vehicle chassis and the steerable front wheels through conduits that pass through a hydraulic swivel that is located on the vertical axis for the cab.

The second steering system consists of a mechanical power steering system including a gear that is secured to the chassis and has an input shaft connectable to the steering wheel and an output shaft connected to the front wheels. The input shaft is connected to the steering wheel through a disconnectable linkage system. A selector unit is located in the cab to allow the operator to select the mode of steering for the vehicle.

BRIEF DESCRIPTION OF THE SEVERAL VIEWS OF THE DRAWINGS

FIG. 1 schematically illustrates a vehicle having the dual steering system incorporated therein;

FIG. 2 is a schematic illustration of the connection between the steerable front wheels and the steering systems; and FIG. 3 is an enlarged fragmentary sectional view of the dual steering system.

DETAILED DESCRIPTION

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiment illustrated.

FIG. 1 of the drawings generally indicates a vehicle 10 which is capable of having the present invention incorporated therein. Vehicle 10 consists of a vehicle chassis 12 supported on a plurality of wheels 14 and 16 with at least one pair of wheels, such as front wheels 16 being steerable to control the direction of the vehicle. Vehicle chassis 12 supports a turntable 20 for rotation about a substantially vertical axis 22 and turntable 20 has an operator's cab or compartment 24 defined thereon. Turntable 20 also supports a power plant 26 and other suitable hydraulic controls for supplying pressurized fluid from a reservoir. A hydraulic swivel 28 well known in the art, provides hydraulic connections between vehicle chassis 12 and turntable 20 for a purpose that will be described later. Turntable 12 also supports a multisection crane boom 29 which is well known in the art and the detailed description thereof does not appear to be necessary.

FIG. 2 of the drawings generally illustrates one type of steering control system for controlling the turning movement of steerable front wheels 16. The control system includes a member 32 that forms part of vehicle chassis 12 and the opposite ends of member 32 have vertical openings 34 which rotatably support steering knuckles 36. Steering knuckles 36 have axles 38 upon which front wheels are rotatably supported and knuckle arms 40 extending therefrom which are interconnected by a tie rod 42. A steering arm 44 is secured to one of the steering knuckles 36 and is connected to pitman arm 45 on the output shaft 47 (FIG. 1) of a steering gear 46 through a drag link 48.

Steering gear 46 may be of the commercially available power assist type, such as a Hydrapower unit, Model HF64 sold by Ross Engineering. This unit is a fully integrated steering gear which incorporates a hydraulic control valve (not shown) that supplies fluid to a fluid ram 50. Fluid ram 50 has a cylinder 52 connected to vehicle chassis 12 and a piston rod 54 connected to tie rod 42. The control valve which forms part of steering gear 46 has fluid supplied thereto from a reservoir 60 through a pump 62 and conduit 64 while a return conduit 66 connects steering gear 46 to reservoir 60. The control valve of steering gear 46 is connected to opposite ends of cylinder 52 through conduits 68 and 69, as will be described later. Steering gear 46 is thus mechanically connected to wheels 16 through drag link 48 and hydraulically connected thereto through fluid ram 50 and tie rod 42.

The hydrostatic steering system consists of a hydrostatic steering valve 70, which again is of the commercially available type manufactured by Ross Engineering and located in the cab or operator's compartment 24 of the vehicle. Fluid under pressure is supplied to steering valve 70 from pump 62 through conduit 76 and hydraulic swivel 28 while hydrostatic steering valve 70 is connected to reservoir 60 through a conduit 78 and hydraulic swivel 28.

Conduits 76 and 78 each have a two-way valve 80 therein so that the flow through the conduits can be blocked or connected to steering valve 70. Steering valve 70 is also connected to opposite ends of cylinder 52 and this connection includes conduits 82 and 84 that are interconnected with conduits 68 and 69 through two two-way valves 86, for a purpose that will be described later.

According to the present invention, a single steering wheel 90, common to both steering systems, is located in the operator's compartment or cab 24 for vehicle 10. A selector unit 92 is operable to selectively connect steering wheel 90 to either hydrostatic steering unit or valve 70 or to steering gear 46 in a manner that will now be described. The lower end of steering wheel 90 has a splined shaft 94 which slidably supports a double worm gear 96 that is axially shiftable through a selector member 98. The input shaft to hydrostatic steering valve 70 has a worm gear 100 fixed thereto so that axial shifting of worm gear 96 in mesh with worm gear 100 will actuate hydrostatic valve 70 in response to rotation of steering wheel 90.

The input shaft 102 of steering gear 46 is connectable to steering wheel 90 through a disconnectable linkage system 104 (FIG. 3) that includes a shaft 106 having a worm gear 108 fixed thereto and rotatably supported about a fixed axis within the housing of the selector unit 92. Shafts 102 and 106 are interconnected by a collapsable shaft consisting of a first telescopic shaft section 109 having a universal joint 110 at one end thereof connected to input shaft 102 through a quick-disconnect yoke 114. The second telescopic section 116 of the collapsable shaft also has a universal joint 118 at one end thereof connected to shaft 106 through a quick-disconnect yoke 120. The entire collapsable shaft including the yoke may be of the commercially available type sold by the Spicer Division, Dana Corporation, Toledo, Ohio. as an Ag-Master shaft.

As can be appreciated from the above description, the present invention provides a unique system for allowing the operator to utilize hydrostatic steering at a job site which is necessary both from an installation standpoint as well as from an operational standpoint. During this mode of operation, the telescopic shaft is removed from input shaft 102 and shaft 106 to allow universal rotation of turntable 20 on chassis frame 12. Values 80 and 86, which define selector valve means, are positioned to have reservoir 60 and pump 62 connected to hydrostatic steering valve 70 and steering valve 70 connected to opposite ends of cylinder 52 while flow through conduits 68 and 69 is blocked.

If the vehicle is to be transported from one job site to another, especially along a highway, the operator positions the turntable as illustrated in FIG. 1, connects the telescoping shaft to shafts 102 and 106 and moves the double worm gear 96 to the position illustrated in FIG. 3 wherein steering wheel 90 is then connected directly to input shaft 102. Preferably, during the operation of the vehicle with mechanical steering, the turntable 20 is locked in a fixed position with respect to chassis frame 12 by using any type of conventional locking means (not shown).

During the operation of the vehicle with mechanical steering, it is also desirable to have hydraulic power assist for the steering operation. The steering gear sold by Ross Engineering incorporates a valve which automatically supplies fluid from a source to cylinder 52 to provide hydraulic power assist for mechanical steering. This is accomplished by actuating selector valve means 80 and 86, which forms part of the selector unit, to block flow through conduits 76, 78, 82 and 84 while connecting steering gear unit 46 to cylinder 52.

After the operator reaches a subsequent work site, it is only necessary for him to quickly disconnect the two quick-disconnect yokes 114 and 120, shift double worm gear 96 into mesh with worm gear 100 and move selector valves 80 and 86 to have pump 62 and conduit 66 in communication with valve 70 and conduits 82 and 84 in communication with cylinder 52.

After unlocking the turntable with respect to vehicle chassis frame 12, the vehicle is ready for operation under hydrostatic steering control.

One of the advantages of the present invention is that the same fluid ram 50 is utilized both during the hydrostatic steering mode of operation and the mechanical mode of operation, which substantially reduces the cost of providing a dual steering system for the vehicle.

While one embodiment of the invention has been shown and described, it is readily apparent that numerous modifications come to mind without departing from the spirit of the invention. For example, the selector unit 92 could take any number of form and the embodiment shown is illustrated only for purposes of completeness of the disclosure.

What is claimed is:

1. A vehicle having a vehicle chassis supported by a pair of steerable front wheels and at least one pair of rear wheels with said front wheels supported for movement about vertical axes to steer said vehicle, a cab rotated about a vertical axis on said chassis, and a dual steering system for said vehicle, said dual steering system including a hydrostatic steering system, a mechanical actuated power steering system and a steering wheel in said cab common to both said systems; said hydrostatic steering system including a hydrostatic steering valve in said cab, a pressurized fluid source and a reservoir connected to said valve, a fluid ram having one element connected to said chassis and a second element connected to said front wheels, and conduit means connecting said valve to said fluid ram; said mechanical actuated power steering system including a steering gear secured to said chassis and having an input shaft and an output shaft, linkage means connecting said output shaft to said front wheels, a disconnectable linkage system extending from said input shaft to said cab adjacent said steering wheel; and a selector unit in said cab adjacent said steering wheel for selectively connecting said steering wheel to said steering valve or said linkage system so that said vehicle may be steered by either said hydrostatic steering system or said mechanical actuated power steering system.

2. A vehicle as defined in claim 1, in which said disconnectable linkage system includes a stationary shaft rotatable about a fixed axis in said cab and connectable to said steering wheel and a collapsable shaft connecting said stationary shaft to said steering gear.

3. A vehicle as defined in claim 1, in which said steering gear includes a control valve with conduits connecting said control valve to said fluid ram, and in which said selector unit includes selector valve means for selectively connecting said reservoir and pressurized fluid source to said fluid ram through said control valve or through said steering valve.

* * * * *